United States Patent Office.

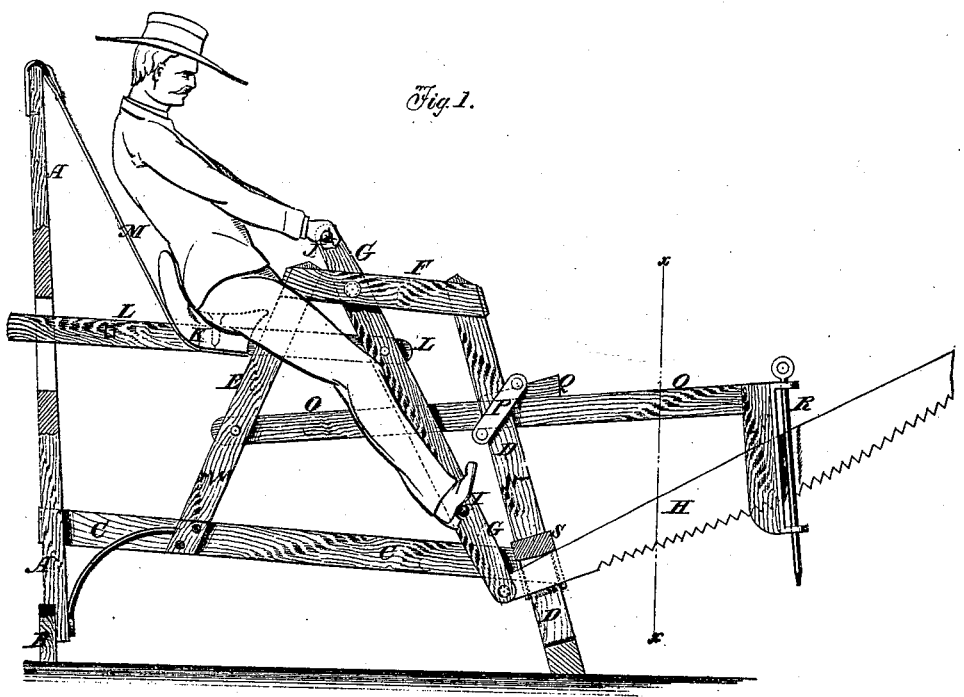
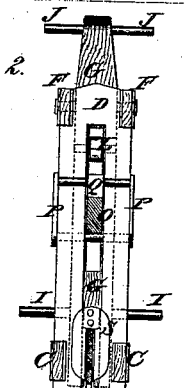

DANIEL HELLER, OF MILTON CENTRE, OHIO.

Letters Patent No. 109,900, dated December 6, 1870.

IMPROVEMENT IN SAWING-MACHINES.

The Schedule referred to in these Letters Patent and making part of the same.

*To all whom it may concern:*

Be it known that I, DANIEL HELLER, of Milton Centre, in the county of Wood and State of Ohio, have invented a new and useful Improvement in Sawing-Machine; and I do hereby declare that the following is a full, clear, and exact description thereof, which will enable others skilled in the art to make and use the same, reference being had to the accompanying drawing forming part of this specification, in which—

Figure 1 is a side view of my improved machine, part being broken away to show the construction.

Figure 2 is a detail sectional view of the same taken through the line $x\ x$, fig. 1.

Similar letters of reference indicate corresponding parts.

My invention has for its object to furnish an improved machine for operating a "cross-cut" or other wood-saw, which shall be simple in construction and effective in operation, enabling one man to do more work than two with the ordinary saw, and with greater ease; and It consists in the construction and combination of certain parts of the machine, as hereinafter more fully described.

A is an upright, which may be vertical or slightly inclined, and which should have a cross-piece, B, attached to its lower end, to give it a firm bearing upon the ground.

To the sides of the lower part of the upright A are attached the rear ends of the bars C, the forward ends of which are attached to the sides of the lower part of the upright D.

The lower end of the upright D should be made wedge-shaped or pointed, to cause it to take a firm hold upon the ground and prevent any oscillation of the forward part of the machine.

E is an upright, the lower end of which is secured to and between the rear parts of the bars C.

The upper ends of the uprights D E incline toward each other, and are connected and held in their proper positions by the bars F.

G is a beam which is pivoted to and between the rear parts of the bars F.

The lower end of the beam G is slotted to receive the rear end of a saw, H, which is pivoted and secured to said beam G by a pin or bolt.

To the lower part of the beam G are attached pins or rests I, for the feet of the operator, and to its upper end are attached pins or handles J for the hands of the operator.

The operator, when working the machine, sits upon a saddle or seat, K, attached to the bar L, the forward part of which passes through a slot in the upright E, and its forward end enters a slot in the pivoted beam G, where it is pivoted to said beam. The rear end of the bar L passes through and works in a guide-slot formed in the upright A.

M is a strap, the upper end of which is attached to the upper end of the upright A, and its lower end is attached to the seat K or bar L, or to both, so as to suspend the said bar and allow it to swing back and forth freely.

By this construction the operator, sitting upon the bar L, forces the saw forward by pressing upon the pins I with his feet, to push forward the lower end of the beam G, and at the same time pulling upon the pins J with his hands.

When the forward stroke has been completed the operator relaxes his hands and feet, which throws his whole weight upon the bar L, which causes the said bar to move to the rearward and draws the saw back ready for another forward stroke.

The forward part of the saw is held in an upright position and guided, while beginning the cut, by passing through a slot in the downwardly-projecting end of the arm N, the upper end of which is rigidly secured to the forward end of the bar O.

The bar O passes back through a slot in the upright D, through a slot in the beam G, and its rear end enters a slot in the upright E, where it is pivoted to said upright.

The bar O is adjustably secured in position for the lower end of the arm N to rest upon the log or stick to sawn by the link or yoke P, which passes diagonally around the upright D and bar O, upon which it is tightened by the wedge Q, as shown in figs. 1 and 2.

R is a pin which passes through eyes attached to the forward side of the slotted arm N, and is designed to be driven into the log or stick of timber to be sawn to hold the arm N steadily in place.

The saw is kept from vibrating in the slot in the upright D, and thus bringing the saw-teeth in contact with said upright, by the guard S, which is fitted into the slot in the said upright D, is made with flanges upon the side edges of its front and rear sides to keep it in place in said slot, and is slotted upon its lower side to receive the upper edge or back of the saw, as shown in figs. 1 and 2.

Having thus described my invention,

I claim as new and desire to secure by Letters Patent—

1. The combination of the pivoted beam G, pins or rests I, pins or handles J, pivoted bar L, and strap M, with each other and with the frame A B C D E F, substantially as herein shown and described, and for the purpose set forth.

2. The combination of the slotted arm N, adjustable-pivoted bar O, and pin R, with the other parts of the machine, substantially as herein shown and described, and for the purpose set forth.

DANIEL HELLER.

Witnesses:
 J. C. ARMSTRONG,
 DAVID E. WRIGHT.